C. D. P. Watters,
Egg-Cup,
N° 77,140. Patented Apr. 21, 1868.
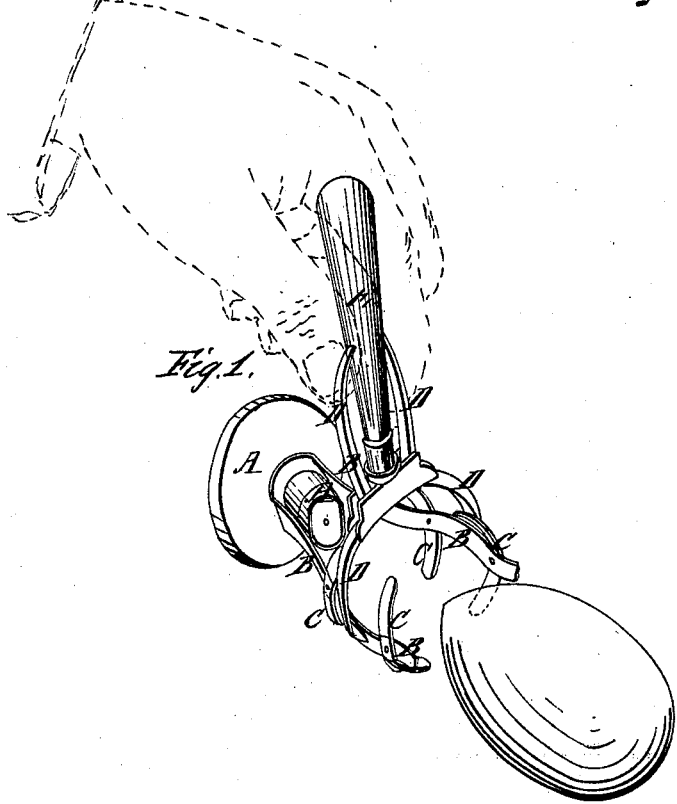
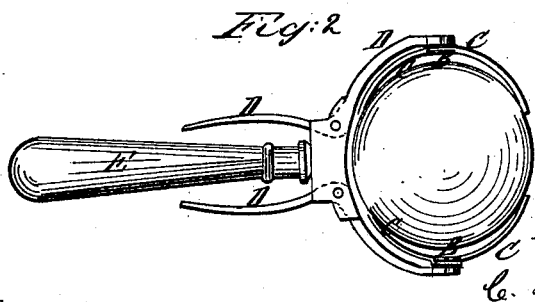
Witnesses
W. C. Aslikette
J. Fraser
Inventor
C. D. P. Watters
per Munn & Co.
attorneys

United States Patent Office.

C. D. P. WATTERS, OF NEW YORK, N. Y.

Letters Patent No. 77,140, dated April 21, 1868.

IMPROVED EGG-CUP.

*The Schedule referred to in these Letters Patent and making part of the same.*

TO ALL WHOM IT MAY CONCERN:

Be it known that I, C. D. P. WATTERS, of the city, county, and State of New York, have invented a new and improved Egg-Cup; and I do hereby declare that the following is a full, clear, and exact description thereof, which will enable others skilled in the art to make and use the same, reference being had to the accompanying drawings, forming part of this specification, in which—

Figure 1 represents a perspective view of my improved egg-cup.

Figure 2 is a plan or top view of the same.

Similar letters of reference indicate corresponding parts.

This invention relates to a new device, the object of which is to facilitate the taking up of boiled eggs from the plate, and to hold the same in a convenient position to allow their being partly peeled, and their subsequent removal from the shell.

The invention consists in the use of two spring-jaws projecting from a base, and connected with arms hinged to a handle, all operating so that the aforesaid object may be attained.

A, in the drawing, represents a circular or other metal or other base, having a concave upper face, which is fitted to receive the tip of an egg. From the opposite sides of the base, project upward two curved spring-arms B B, which are made of sheet metal or other suitable material, and which, if they are made narrow, as shown, are provided with suitable curved cross-arms C, or other horizontal or lateral projections. To the two jaws B are fastened two L-shaped bars D D, which are at their angles pivoted to the end of a handle, E, as shown, the said handle being, for the reception of the pivots, provided with suitable projecting lugs, as shown.

The operation is as follows: To take up an egg, the apparatus is taken hold of at the handle E, the projecting ends of the bars D are pressed against the handle, as shown in fig. 1, whereby the jaws B B are opened. The device is then brought with the axis of the base in a horizontal position, and is then moved towards the pointed end of the egg, as in fig. 2, until the egg is between the jaws. The bars D D are then released, when the jaws will close against the egg, and will hold the same. The device can then be set up in an upright position, and the egg will be securely held in it, so that the upper part of the shell may be removed, and the contents taken out, as from any ordinary egg-cup.

The great advantage of this device is, that by its use the handling of the hot eggs is done away with.

Having described my invention, I claim as new, and desire to secure by Letters Patent—

An egg-cup consisting of the base, A, spring-jaws B, levers D, and handle E, all made and operating substantially as herein shown and described.

C. D. P. WATTERS.

Witnesses:
WM. F. MCNAMARA,
ALEX. F. ROBERTS.